Jan. 20, 1942.  V. VOORHEES  2,270,360
CATALYTIC HYDROCARBON CONVERSION
Filed Dec. 31, 1938  2 Sheets-Sheet 2
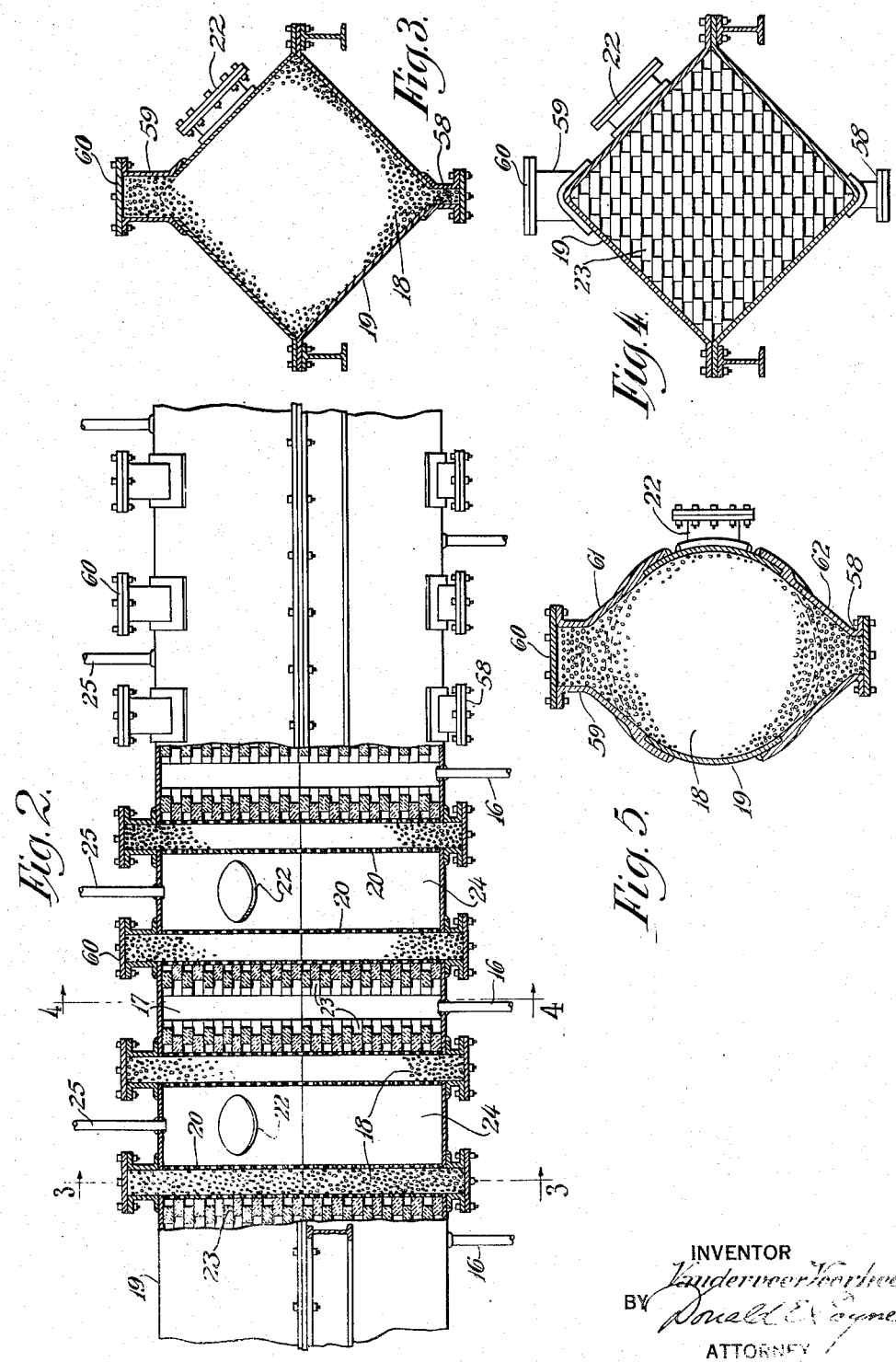

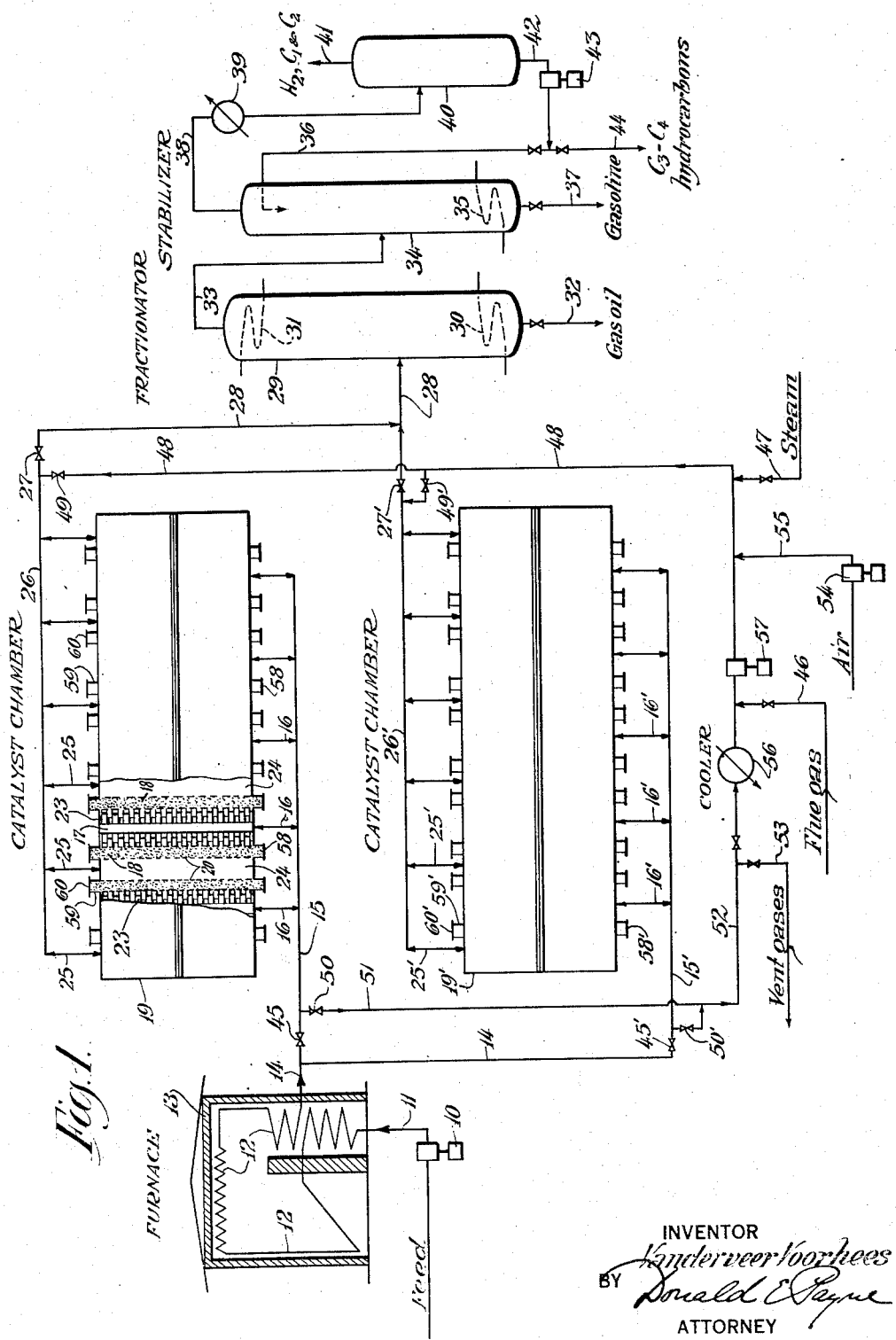

Patented Jan. 20, 1942

2,270,360

UNITED STATES PATENT OFFICE 2,270,360

CATALYTIC HYDROCARBON CONVERSION

Vanderveer Voorhees, Hammond, Ind., assignor to Standard Oil Company, Chicago, Ill., a corporation of Indiana Application December 31, 1938, Serial No. 248,854

6 Claims. (Cl. 196—52)

This invention relates to catalytic hydrocarbon conversion and more particularly to using a fixed bed catalyst.

An object of my invention is to use a catalyst chamber which will handle large volumes of hydrocarbon vapors and will insure a thorough and intimate contact of said vapors with a porous catalyst, with minimum pressure drop through the catalyst bed and with a minimum effective time of contact. Further objects are to insure uniform catalytic treatment of all vapors passing through the catalyst bed and to avoid short-circuiting and channelling.

A further object of the invention is to obtain a more adequate temperature control than has heretofore been possible and especially to avoid overheating and "hot spots" during regeneration. A further object is to utilize means for dissipating and utilizing the heat evolved in catalyst regeneration and for supplying the heat required for catalytic conversion.

A further object of the invention is to use a catalyst chamber structure and means for charging and discharging catalyst thereto and therefrom. Other objects will be apparent as the following detailed description of my invention proceeds.

The apparatus preferably consists of a horizontal chamber provided with perforated vertical baffles or screens which divide the chamber into alternate catalyst spaces and open spaces. The catalyst material is thus positioned in vertical beds about 2 to 12 inches, preferably about 2 to 6 inches in thickness. Oil vapors to be treated are introduced between adjacent beds and are withdrawn from the space on the other side of said beds. The uniform distribution of vapors in the spaces between catalyst beds makes it possible to obtain uniform flow of these vapors through a very large catalyst area, but the vapors are in contact with the catalyst for only a fraction of a second to a few seconds, so that excessive contact, undesirable side reactions and undue carbon deposition are avoided. The catalyst-retaining plates or screens themselves serve to equalize the temperature of the thin catalyst bed, but in addition, I prefer to employ heat transfer means in close proximity to each catalyst bed for absorbing the heat of regeneration, mainly by radiation and convection, but partly by direct conduction from the catalyst.

Heretofore the regeneration of spent catalyst by the burning of carbon therefrom has given rise to the serious problem of overheating, because the hot gases from the initial combustion zone preheat the adjacent catalytic material so that the combustion temperature soon rises above safe limits. In my invention as the regeneration gases pass through the very thin catalyst bed, both the radiant heat from the catalyst and the sensible heat of the regeneration gases are absorbed by adjacent heat retention material. The hot regeneration gases are not only cooled but they are withdrawn out of contact with incoming fresh regenerating gas before they can cause any overheating. The hot regeneration gases do not have to pass through tubes which are in close proximity to other catalyst material, as is the case with tubular type catalyst chambers heretofore employed. Furthermore, the heat retention material which absorbs heat from the regeneration gases also supplies part of the heat of cracking when the catalyst chamber again goes on stream.

When thin catalyst beds are retained on a horizontal support there is a tendency for the gas flow to dislodge the catalyst particles and thereby form paths of minimum resistance which lead to short circuiting. In my thin vertical beds the force of gravity keeps the catalyst adequately packed at all times and a reserve catalyst supply at the top of the bed compensates for any shrinkage and positively prevents any short-circuiting.

The catalyst may be readily discharged from the vertical beds by simply opening a large valve at the base thereof. Similarly, catalyst may be easily charged into each bed through a valve or manhole at its top. Manholes at the side of the chamber permit easy access for cleaning the catalyst screens. The whole structure is extremely simple and easily constructed and operated. By manifolding the alternate spaces between catalyst beds an extremely large capacity can be obtained for any given catalyst chamber volume and a minimum number of valves are required.

The invention will be more clearly understood from the following detailed description read in connection with the accompanying drawings which form a part of this specification, and in which:

Fig. 1 is a flow diagram of the catalytic conversion system used, a portion of the catalyst chamber being shown in vertical section;

Fig. 2 shows a longitudinal vertical section through a preferred form of the catalyst chamber;

Fig. 3 is a transverse section taken along the lines 3—3 of Fig. 2;

Fig. 4 is a transverse section taken along the lines 4—4 of Fig. 2; and

Fig. 5 is a transverse section of a modified and preferred form of a catalyst chamber which is of circular rather than rectangular section.

The invention will be described as applied to the catalytic cracking of Mid-Continent gas oil, although it should be understood that any other charging stock may be used. The invention is particularly applicable to the cracking of waxes and wax-bearing oils—both naturally occurring and synthetically produced—for instance by the carbon monoxide-hydrogen or carbon monoxide-hydrocarbon synthesis. The invention is also applicable to the catalytic reforming of naphtha, and to the dehydrogenation of naphtha or other hydrocarbon oils or gases. It is also applicable to the polymerization or alkylation of hydrocarbon gases by processes employing solid catalysts or catalysts mounted on or carried by solid carriers, particularly when such processes lead to the deposition of carbon on the catalyst and require regeneration by the burning of such carbon with an oxygen-containing gas. The invention may be applicable to other processes than those of hydrocarbon conversion, as will be apparent from the following detailed description.

Referring to the drawings, the charging stock is introduced by pump 10 through line 11 into coils 12 of pipe still 13, where it is heated to a temperature of about 700° to 950° F., preferably about 850° F. At this temperature and at atmospheric pressure the vaporized charging stock is conducted through transfer line 14, valve 45, manifold 15 and branch lines 16 into spaces 17 between adjacent catalyst beds 18 in catalyst chamber 19. The catalyst beds are retained between vertical perforated plates or screens 20 which are spaced about 2 to 12 inches, preferably about 2 to 6 inches apart. The plates or screens may be made of Monel metal or any other suitable chromium-iron, nickel-iron, or nickel-chromium-iron alloy. They may be made in sections and access to the chamber for the purpose of cleaning or replacing them may be had through suitable openings 22 along the side of the catalyst chamber (Fig. 2). It should be understood that the space between catalyst beds is much greater than the thickness of the catalyst beds in order to provide for uniform distribution of gases and vapors, and in order to provide for access to the chamber when cleaning or repair is necessary.

On both sides of space 17 I prefer to employ a fire brick checker work 23 which effects uniform distribution of the vapors to the catalyst beds, and which acts as a heat storage and heat transfer medium, as will hereinafter be described. The hot vapors pass through this checker work, and thence through the adjacent catalyst bed to spaces 24 from which they are withdrawn through branch lines 25, manifold 26, valve 27 and line 28 to fractionator 29 which is provided with reboiling means 30 at its base and reflux means 31 at its top. Components heavier than gasoline are withdrawn from the fractionator through line 32. This so-called gas oil fraction is an excellent Diesel fuel and it may be further fractionated or refined for this or any other purpose. Alternatively, it may be charged to a thermal cracking system or to this or any other catalytic conversion system for the production of more gasoline or lighter hydrocarbon products.

The gasoline and lighter hydrocarbons are withdrawn overhead from the fractionator through line 33 into stabilizer 34 which is provided with a suitable reboiler 35 and reflux means 36. The gasoline fraction is withdrawn from the base of the stabilizer through line 37 and fractions lighter than gasoline are withdrawn overhead through line 38 and condenser 39 to separator 40, the uncondensed hydrogen methane and perhaps $C_2$ hydrocarbons being withdrawn through line 41, and the condensed $C_3$ and $C_4$ hydrocarbons being withdrawn through line 42 and passed by pump 43 through line 36 for reflux or through line 44 to storage. These $C_3$, $C_4$ hydrocarbons may be recycled to line 11 for effecting catalytic gas reversion, they may be polymerized in a separate system and they may be converted by alkylation with concentrated sulfuric acid or other catalysts into high quality motor fuel. It should be understood that any other suitable fractionating system may be employed and that any desired pressures and temperatures may be used therein.

The space velocity in the catalyst chamber may be expressed as the ratio of a volume of liquid feed per hour to the actual volume of catalyst space. I prefer to employ space velocities of from .25 to 4 volumes of liquid feed per volume of catalyst space per hour corresponding in general to a contact time of about 1 to 20 seconds, depending on the oil, the temperature, etc. I prefer to maintain the catalyst on stream for a period of about 10 minutes to 6 hours before regeneration. Ordinarily I prefer to operate under conditions which will give about 30% to 40% cracking per pass since more severe operating conditions give rise to unduly large carbon deposits. After a period on stream of about 10 minutes to 6 hours, preferrably about 15 minutes to one-half hour, valves 45 and 27 are closed and valves 45' and 27' are opened so that cracking may be carried out in chamber 19' while chamber 19 is being regenerated.

Before regeneration the catalyst chamber is purged with flue gas introduced through line 46 and/or steam introduced through line 47, conducted by line 48 and valve 49 to manifold 26 and withdrawn through manifold 15, valve 50 and lines 51 and 52 to vent 53. After a few seconds purging, air is introduced into the circulating flue gas by pump 54 and line 55, a sufficient amount of flue gas being cooled in cooler 56 and recycled by pump 57 to obtain the desired temperature control.

The regeneration may be effected much more rapidly in my system than in systems heretofore employed because the thin catalyst beds retained between closely spaced metal plates do not have a chance to develop hot spots. In the first place, the metal is so close to every part of the catalyst bed that it tends to absorb and to conduct away the heat from any incipient hot spot. In the second place, the hot gases which leave the thin catalyst bed are immediately cooled by the heat transfer medium which is immediately adjacent the catalyst bed in space 17, and the hot regeneration gases in space 17 do not come in contact with any other catalyst bed, but are immediately removed through branch lines 16. In the third place, the regeneration gases, are applied over such a wide area that regeneration is substantially simultaneous throughout the entire chamber so that there is no problem of controlling the rate of travel of a combustion zone or hot spot. The regeneration in this system may thus be effected in a relatively short time.

By placing brick checker work in space 17, I not only cool the regeneration gases before they leave the chamber, but I absorb a considerable amount of heat in the checker work. When the catalyst chamber again goes on stream the heat of this checker work supplies a considerable portion and may supply all of the heat of cracking required for the conversion process. For instance, regeneration temperatures may be as high as 1050° F. In which case the checker work may be heated to 1000° F. After purging its temperature may be about 925° F. Gas oil vapors may be introduced at 850° F. and they may pick up enough heat from the checkerwork to effect most of the cracking. At the end of the cracking portion of the cycle the brick work may be cooled to about 875° to 850° F. at which temperature it acts as a heat absorption agent for regeneration. The checkerwork then acts as a temperature stabilizer for the whole system.

It should be understood, however, that instead of employing brick checker work I may employ any other heat retention material and in fact, I may employ heat exchange tubes or coils for circulating heat transfer fluids such as steam, fused salts (such as a mixture of sodium nitrate, potassium nitrate and sodium nitrite), lead, mercury, diphenyl, etc., the heat imparted to such fluids being utilized for the generation of steam or power or for effecting further cracking. In polymerization systems where both the on stream and regeneration cycles are exothermic, cooling coils will, of course, take the place of the brick checkerwork.

For a low pressure equipment the catalyst reaction chamber 19 may be rectangular in cross section, as indicated in Figs. 3 and 4. At the base of each catalyst chamber suitable closures or valves 58 may normally retain the catalyst in position but may be opened for catalyst withdrawal. At the top of the catalyst chamber I provide an enlarged opening 59 closed by a suitable cover or other closure 60 for the introduction of catalyst.

It is particularly important that the catalyst be thoroughly and uniformly packed throughout the chamber. The sloping lower walls insure the discharge of all catalyst when the chamber is being emptied, i. e. insures the avoidance of any dead spaces. The sloping upper walls insure the avoidance of empty spaces in the catalyst chamber, the excess catalyst in the enlarged opening 59 serving to keep the catalyst space entirely filled at all times. If there is any shrinkage in catalyst volume after it has been on stream for some time, additional catalyst from this reservoir at the top of the chamber flows downwardly by gravity to fill any voids that may develop and thus insures a solidly packed catalyst bed through which there can be no by-passing of unreacted gases. To further insure against by-passing, a short baffle plate may be employed in the upper part of the catalyst bed to positively prevent gases from flowing between the top of the catalyst bed and the catalyst chamber wall.

Where the catalyst chamber must withstand pressure it should be made in circular form but in such case provision must be made to avoid the possibility of dead spaces after catalyst withdrawal and to avoid empty spaces when the catalyst space is filled. A circular catalyst space would be objectionable from this standpoint and I therefore deform the top and bottom of the circular catalyst space to provide inclined surfaces leading to the upper and lower openings. The top and bottom of the catalyst chamber is preferably cut away immediately above and below the catalyst spaces, and hopper-shaped charge and discharge sections 61 and 62 are welded over the cut away sections so that there will be no possibility of voids or dead spaces during the operation of the system.

For the catalytic cracking operation hereinabove described I prefer to employ a catalyst of the hydrosilicate of aluminum type which may consist of pelleted or extruded clay which has been acid-treated or which may be in the form of granules of silica gel or precipitated silica activated by one or more metals. I prefer to activate the silica by adsorbing the metal compound on it from an acid solution. Typical metals which I may use for activation are copper, nickel, cadmium, manganese, zinc, etc. For the purpose of dehydrogenation I prefer to employ magnesium chromite or chromium oxides deposited on bauxite or silica gel. For polymerization I prefer to employ phosphoric acid deposited on kieselguhr. No invention is claimed in any of these catalysts per se and they will not be described in further detail. As above indicated, the reaction temperatures will depend upon the particular process employed, the particular charging stocks and the nature of the desired products. In exothermic reaction such as catalytic polymerization the brick checker work should not be used and coils for suitable heat exchange fluid should be substituted therefor as hereinabove pointed out. Such alternative heat transfer means may be employed in place of the brick checker work, even in the catalytic cracking system.

It should be understood that the accompanying drawings are diagrammatic, that valves such as 45, 50, 27, 49, etc. may be electrically or pneumatically operated, that all of the high temperature equipment should be well insulated, and that modifications may be made of the particular form or shape of the apparatus. Cooler 56, for example, may be a heat exchanger providing part of the heat necessary for heating the charging stock in line 11. I do not limit myself to any of the details hereinabove set forth except as defined by the following claims which should be construed as broadly as the prior art will permit.

I claim:

1. A catalytic hydrocarbon conversion process which comprises vaporizing and heating a hydrocarbon-charging stock to reaction temperature, passing the heated vapors thru a thin catalyst bed less than 12 inches in depth in a reaction chamber, then purging the reaction chamber, then regenerating the catalyst by reverse flow of hot oxygen-containing gases, absorbing regeneration heat from the regeneration gases in metal chamber walls and additional fixed heat-retention material in a separate zone immediately adjacent said thin catalyst bed whereby regeneration gases are cooled and then utilizing the absorbed heat for supplying the last increment of heat for effecting the next catalytic conversion step by passing heated vapors thru said zone before passing them thru said thin catalyst bed.

2. The method of catalytically cracking hydrocarbon oils to form high quality motor fuels which comprises vaporizing and heating said oils to about 850° F., passing said vapors thru a heat retention bed immediately adjacent a thin catalyst bed, which heat retention bed is at a temperature of about 875 to 950° F., whereby the vapors are heated to about 925° F., immediately passing the vapors at that temperature thru a thin catalyst bed of less than 12 inches in depth, and withdrawing the vapors from the system after a time of contact of about 1 to 20 seconds.

3. The method of claim 2 which includes the further step of regenerating the catalyst by burning the carbon therefrom with an oxygen-containing gas at a temperature not higher than about 1050° F., and passing said gas first thru said thin catalyst bed and then thru said adjacent heat-retention bed whereby at least a portion of the heat of combustion is absorbed by said heat-retention bed.

4. In the operation of a catalyst chamber which contains the following sequences of elements: thin catalyst bed, heat-retention means, open space, heat-retention means, thin catalyst bed, and open space, respectively, whereby one alternate series of open spaces is between heat-retention means and another alternate series of open spaces is between catalyst beds, which catalyst chamber is provided with a manifold connected to each of the first-named series of open spaces, and another manifold connected to each of the second-named series of open spaces, the method of catalytically converting hydrocarbon oils to form high quality motor fuels, which comprises preheating said heat-retention means to a temperature of at least 875 to 950° F., vaporizing and heating said oils to about 700 to 850° F., passing said vapors to one of said manifolds and thence into the spaces between heat-retention means, then passing the vapors through the heat-retention means and through the thin catalyst bed at a temperature of about 850 to 950° F., and removing said vapors from the open spaces between catalyst beds through the manifold connected to said spaces.

5. In the operation of a catalytic conversion system which comprises a reaction chamber, a plurality of transverse perforated retention means in said chamber for dividing it into spaces for catalyst beds and open spaces respectively, heat-retention means in alternate open spaces, a manifold connected to the alternate spaces containing heat-retention means and a second manifold connected to alternate spaces which do not contain heat-retention means, the method of catalytically converting hydrocarbons into high quality motor fuels which comprises heating said heat-retention means to a temperature of about 875 to 950° F., vaporizing and heating the hydrocarbon oil at a temperature of about 850° F., passing said vapors through said first-named manifolds into the spaces containing the heat-retention material, contacting the vapors with said heat-retention material, then passing the vapors through the catalyst bed to the alternate spaces which contain no heat-retention material, removing hydrocarbons from said last-named alternate spaces through said second manifold, periodically interrupting the flow of hydrocarbons, introducing a gas containing oxygen into the reactor through said second manifold and passing said gas through said catalyst beds to said open spaces containing heat-retention material, whereby the exothermic heat of catalyst regeneration is transferred by said gas to said heat-retention material for heating said material back to a temperature of about 875° to 950° F.

6. The method of claim 5 wherein the heat retention material is fire brick.

VANDERVEER VOORHEES.